May 26, 1964     C. H. PETERSEN     3,134,188
INSULATED ICE FISHING PAD
Filed July 23, 1962
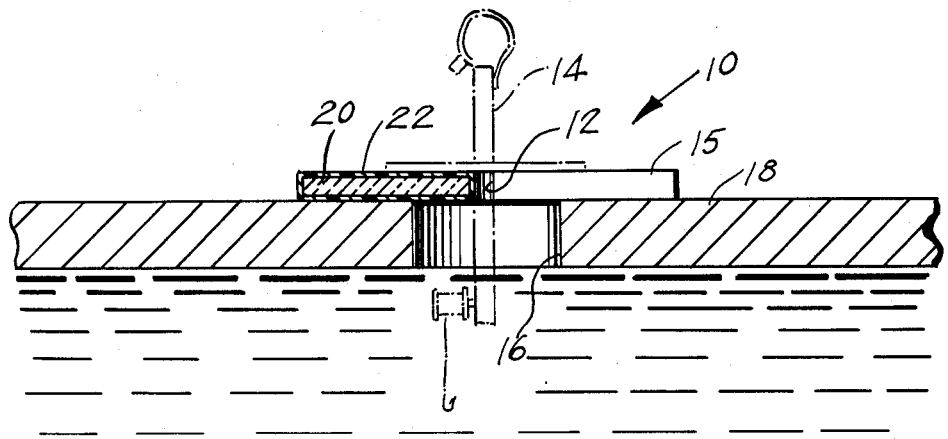
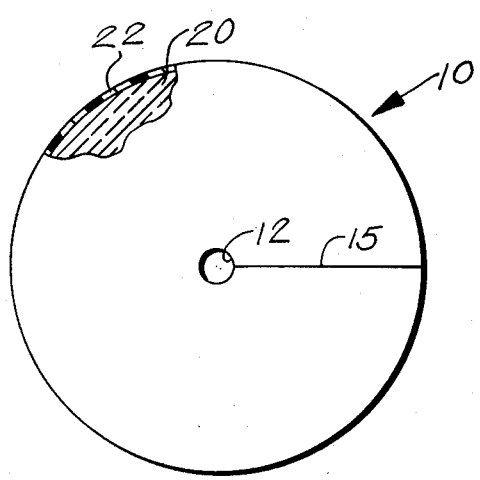
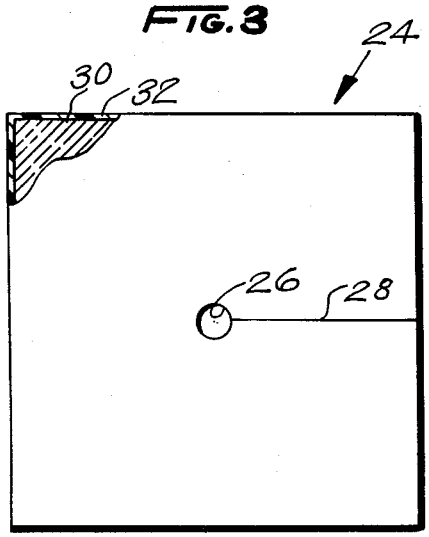
INVENTOR.
CHRISTIAN H. PETERSEN

United States Patent Office 3,134,188
Patented May 26, 1964

3,134,188
INSULATED ICE FISHING PAD
Christian H. Petersen, Rte. 1, Luck, Wis.
Filed July 23, 1962, Ser. No. 211,694
4 Claims. (Cl. 43—17)

This invention relates to fishing equipment and more particularly to a pad for ice fishing.

It is an object of the present invention to provide an insulated ice fishing pad that will keep an ice fishing hole free of ice and blowing snow.

Another object of the present invention is to provide an insulated ice fishing pad that will receive the fishing gear with a minimum of effort and will be covered with suitable plastic material thus making it waterproof.

Other objects of the invention are to provide an insulated ice fishing pad bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a sectional view of an ice fiishing pad comprising the present invention;

FIGURE 2 is a top plan view of the present invention; and

FIGURE 3 is a top plan view showing a modified form of the invention.

Referring now more in detail to the drawing, an insulated ice fishing pad 10 made in accordance with the present invention is shown to include a central and circular opening 12 which snugly receives tip-up gear 14. A radial slot 15 through pad 10 is provided for receiving tip-up gear 14. Pad 10 is positioned over the opening 16 through ice 18. The circular insulating material 20 within pad 10 is covered over its entire surface and into said slit and opening with waterproof plastic cover 22.

In operation, the fisherman after having cut a hole into the ice 18 spreads apart the slit 15 of pad 10 and slidably inserts the tip-up gear 14 until it snugly fits into opening 12. The insulating material 20 covered by the waterproof plastic cover 22 rests in contact with the ice surface and thus prevents the opening 16 from freezing and further prevents snow from entering the opening 16.

It will thus be recognized that the entire pad 10 is flexible throughout its entire structure thus providing easy insertion of tip-up gear 14 with a minimum of effort.

In FIGURE 3 a modified form of pad 24 of rectangular configuration is shown to include a circular opening 26 and an elongated slit 28 extending from one edge to the periphery of opening 26. Pad 24 is a square piece of insulating material 30 and the entire surface of pad 24 is covered with waterproof plastic cover 32.

In operation, pad 24 receives tip-up gear in the previously mentioned manner as the preferred embodiment of the present invention and is placed over an ice opening.

While various changes may be made in the detail construction it shall be understood that such changes shall be within the spirit and scope of the present invention as defined by the appended claims.

What I claim as new and desire to protect by Letters Patent of the United States is:

1. An ice fishing pad of the class described for fishing through ice with a tip-up gear comprising, in combination, a flexible insulated flat pad having a substantially square outer contour, having four sides, a centrally disposed opening in said pad and a slit in said pad, said slit disposed in said pad radially from said centrally disposed opening, said opening being of circular configuration, said slit extending to the midportion of the edge of one of said sides, said slit parting said pad to provide a means for access from the outer contour of said pad to the center of said pad for connecting the outer contour of said pad through said opening in the center to receive said fishing tip-up gear and said pad comprising an insulation material and a plastic covering enclosing said insulation material.

2. A combination according to claim 1, wherein said plastic covering extends over the entire surface of said pad and into said slit and opening within said pad and prevents snow from entering above and below said pad into an opening in the ice.

3. A combination according to claim 2, wherein said pad is centered over the said opening in said ice for fishing and prevents temperatures from outside air from freezing over said opening within said ice and said tip-up gear is supported by a plate secured to said tip-up gear and said plate rests upon the upper surface of said pad thus preventing said tip-up gear from falling into said ice opening.

4. A combination according to claim 3, wherein said square configurated pad receives tip-up gear through said substantially circular opening centrally through said square pad and said slit of elongated configuration extends from one side of said square pad through the inner periphery of said circular opening through said square pad thus providing means for entrance of said tip-up gear into said opening of circular configuration through said pad.

References Cited in the file of this patent

UNITED STATES PATENTS

| | | |
|---|---|---|
| 1,253,746 | Teeling | Jan. 15, 1918 |
| 2,447,251 | Huette | Aug. 17, 1948 |
| 2,517,724 | Schuh | Aug. 8, 1950 |
| 2,691,842 | Brown | Oct. 19, 1954 |
| 2,786,294 | Whitacre | Mar. 26, 1957 |
| 2,883,784 | Obernolte | Apr. 28, 1959 |
| 2,970,400 | Nolin | Feb. 7, 1961 |

FOREIGN PATENTS

| | | |
|---|---|---|
| 575,390 | Italy | Apr. 10, 1958 |